(12) United States Patent
Tanaka

(10) Patent No.: US 6,957,040 B1
(45) Date of Patent: Oct. 18, 2005

(54) IMAGE COMMUNICATION SYSTEM

(75) Inventor: Hiroshi Tanaka, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 812 days.

(21) Appl. No.: 09/606,934

(22) Filed: Jun. 30, 2000

(30) Foreign Application Priority Data

Jun. 30, 1999 (JP) ................................ 11-184876

(51) Int. Cl.⁷ .............................................. H04H 7/00
(52) U.S. Cl. ............... 455/3.06; 455/856.1; 348/207.2; 345/186
(58) Field of Search ........................ 348/333.02, 211.2, 348/207.2, 207.99, 333.07, 231, 222, 552, 348/232, 233, 229; 713/169; 345/156; 455/414.1, 455/412.1, 558, 566, 3.05, 3.06, 517, 575.1, 455/96.3, 422, 445, 428, 15–19, 560, 556–557, 455/509, 575; 709/217–219

(56) References Cited

U.S. PATENT DOCUMENTS

| | | | | |
|---|---|---|---|---|
| 5,706,097 A | * | 1/1998 | Schelling et al. | ........... 358/296 |
| 5,737,491 A | * | 4/1998 | Allen et al. | .................. 704/270 |
| 5,806,005 A | * | 9/1998 | Hull et al. | .................. 455/566 |
| 5,978,016 A | * | 11/1999 | Lourette et al. | ............. 348/64 |
| 6,038,295 A | * | 3/2000 | Mattes | ..................... 379/93.25 |
| 6,069,648 A | * | 5/2000 | Suso et al. | ............... 348/14.02 |
| 6,085,112 A | * | 7/2000 | Kleinschmidt et al. | ..... 455/556 |
| 6,128,446 A | * | 10/2000 | Schrock et al. | ............. 396/297 |
| 6,128,509 A | * | 10/2000 | Veijola et al. | ............... 455/556 |
| 6,167,469 A | * | 12/2000 | Safai et al. | ..................... 710/62 |
| 6,181,954 B1 | * | 1/2001 | Monroe et al. | .............. 455/557 |
| 6,201,975 B1 | * | 3/2001 | Isberg et al. | ................. 455/557 |
| 6,219,560 B1 | * | 4/2001 | Erkkila et al. | ............... 455/557 |
| 6,317,609 B1 | * | 11/2001 | Alperovich et al. | ........ 455/556 |
| 6,337,712 B1 | * | 1/2002 | Shiota et al. | ............. 348/231.1 |
| 6,349,324 B1 | * | 2/2002 | Tokoro | ........................ 709/200 |
| 6,374,082 B1 | * | 4/2002 | Carlson | ........................ 455/63 |
| 6,392,697 B1 | * | 5/2002 | Tanaka et al. | ............ 348/220.1 |
| 6,424,843 B1 | * | 7/2002 | Reitmaa et al. | .............. 455/566 |
| 6,434,403 B1 | * | 8/2002 | Ausems et al. | .............. 455/556 |
| 6,466,202 B1 | * | 10/2002 | Suso et al. | ................... 345/169 |
| 6,522,889 B1 | * | 2/2003 | Aarnio | ..................... 455/456.5 |
| 6,535,228 B1 | * | 3/2003 | Bandaru et al. | ............ 345/752 |
| 6,535,243 B1 | * | 3/2003 | Tullis | ...................... 348/207.1 |

(Continued)

FOREIGN PATENT DOCUMENTS

EP                930770 A2 *   7/1999   ............ H04N 1/00

(Continued)

*Primary Examiner*—Pablo N. Tran
(74) *Attorney, Agent, or Firm*—Birch, Stewart, Kolasch & Birch, LLP

(57) ABSTRACT

Transmission and receiving of image data recorded on a digital still camera to and from a server are controlled by a portable telephone set. At the time of transmission, communication between the portable telephone set and the digital still camera and communication between the portable telephone set and the server are established. A reading command is issued from the portable telephone set to the camera. Image data are transmitted in packet units to the portable telephone set from the camera in response to the reading command. The image data is transmitted to the server from the portable telephone set. At the time of receiving, when the communication is established, all image data are transmitted to the portable telephone set from the server. All the image data are transmitted to the camera from the portable telephone set and are recorded in the camera. It is possible to control the transmission and receiving of the image data by the portable telephone set.

1 Claim, 14 Drawing Sheets

U.S. PATENT DOCUMENTS 6,538,692 B2 * 3/2003 Niwa .................... 348/231.1
6,567,661 B2 * 5/2003 McDonnell et al. ... 340/870.07
6,657,660 B2 * 12/2003 Haneda et al. ............ 348/714
6,715,003 B1 * 3/2004 Safai ........................ 710/33

FOREIGN PATENT DOCUMENTS

EP          1189424 A1 *  3/2002  ............ H04N 1/00
WO    WO 9948276 A1 *  9/1999  ............ H04N 1/00

* cited by examiner

Fig. 13

RECORDED
IMAGE LIST 001-0001

001-0002

001-0003

001-0004

001-0005

⋮

002-0001

002-0002

002-0003

⋮

IMAGE COMMUNICATION SYSTEM

BACKGROUND OF THE INVENTION

1. Field of the Invention

The present invention relates to an image communication system comprising an image processor (e.g., a digital still camera) and a portable telephone set which can establish data communication with each other, a portable telephone set and a method of controlling its operations, and a digital camera and a method of controlling its operations.

2. Background of the Invention

Portable telephone sets (including PHS (Personal Handy Phone)) have spread by reducing the costs thereof. Speech communication can be established outdoors by carrying the portable telephone sets.

On the other hand, as personal computers have been developed, digital still cameras have generally spread. It is possible to image a subject using the digital still camera, acquire data representing an image of the subject in the personal computer, and process the image in the computer.

SUMMARY OF THE INVENTION

An object of the present invention to realize communication of image data between a digital still camera and a computer utilizing a portable telephone set.

Another object of the present invention is to improve operability without sacrificing portability of a portable telephone set in a case where at least one of transmission and receiving of image data is performed.

In an image communication system according to the present invention, an image processor (e.g., an electronic digital still camera) and a portable telephone set can establish data communication with each other. Image data representing an image is stored in the image processor, and a reading command to read out the image data is issued to the image processor from the portable telephone set.

The image processor comprises first transmission means for transmitting the stored image data to the portable telephone set in response to the reading command issued from the portable telephone set.

The portable telephone set comprises setting means for setting a destination of transmission of the image data, receiving means for receiving the image data transmitted from the first transmission means of the image processor, and second transmission means for transmitting the image data received by the receiving means to the destination of transmission set by the setting means through a communication network.

According to the present invention, the reading command to read out the image data is issued to the image processor (a digital camera, a personal computer, an image file device, etc.) from the portable telephone set.

When the reading command is issued to the image processor, the image data stored in the image processor is read out, and is transmitted to the portable telephone set.

In the portable telephone set, the destination of transmission of the image data is set (the destination of transmission may be entered, data representing the destination of transmission may be read from a recording medium, or the data representing the destination of transmission may be received). The image data transmitted from the image processor is received, and the received image data is transmitted to the set destination of transmission (e.g., an image server, an image file device, a printer, a computer, a digital camera and so on) through the network.

A user can transmit the image data stored in the image processor to the other image processor through the network using the portable telephone set by only operating the portable telephone set. The image processor need not be operated. Accordingly, the operation can be prevented from being complicated.

The portable telephone set and the image processor are separate from each other. Accordingly, the image communication system is smaller in size, as compared with an apparatus which is the integration of the portable telephone set and the image processor. The image communication system is convenient when they are separately carried.

Both the data communication between the image processor and the portable telephone set and the data communication between the portable telephone set and the destination of transmission may be established by radio. In this case, a radio frequency band between the image processor and the portable telephone set and a radio frequency band between the portable telephone set and the destination of transmission may differ from each other.

In the portable telephone set, image data which should be transmitted to the destination of transmission set by the setting means may be selected, and the data specifying the selected image data may be transmitted to the image processor. In this case, the image data transmitted from the image processor will be transmitted to the destination of transmission in accordance with the selected data.

It is possible to transmit desired image data to the destination of transmission from the image processor by operating the portable telephone set.

List data representing a list of image data may be stored in the image processor. In this case, the portable telephone set further comprises means for receiving the data representing the list of image data which is stored in the image processor. The data representing the list is transmitted to the portable telephone set from the image processor. The image data which should be received is selected from the list represented by the list data received by the list receiving means.

It is possible to relatively simply select the data which should be transmitted to the destination of transmission.

The portable telephone set may comprise second receiving means for receiving the image data transmitted through the network, and second transmission means for transmitting the image data received by the second receiving means to another image processor.

The image data transmitted through the network can be received by the portable telephone set. The received image data can be transmitted to and stored in the image processor.

The portable telephone set may further comprise judgment means for judging whether or not the amount of the image data to be received by the second receiving means is not more than the amount of data which can be stored in the another image processor. In this case, the second receiving means will receive the image data when it is judged that the data amount of the image data to be received by the second receiving means is not more than the amount of data which can be stored in the another image processor.

In order to make the judgment, prior to receiving the image data to be received by the second receiving means, for example, data representing the amount of the image data to be received and the data representing the amount of data which can be stored in the image processor will be respectively transmitted to the portable telephone set. The judgment is made on the basis of the data transmitted to the portable telephone set.

Only when the image data can be stored in the another image processor, the image data is received by the portable telephone set.

The portable telephone set may further comprise receiving command means for entering a command to receive the image data. In this case, the second receiving means will receive the image data when the receiving command is entered from the receiving command means.

When the user desires to receive the image data, the image data transmitted through the telephone line can be received.

For example, image data representing a list of reduced images (e.g., thumbnail images), image data representing a reduced image, data representing a list of images, and so forth are transmitted to the portable telephone set. In the portable telephone set, the reduced image may be confirmed, and image data representing the original image of the reduced image may be received. Alternatively, a list of frame numbers of images may be displayed, and the image to be received may be selected (a receiving command) from the list.

Although in the portable telephone set, the image data can be transmitted, the portable telephone set may be used for receiving the image data, or may be used for both transmission and receiving.

Specifically, in a second aspect of the present invention, there is provided a portable telephone set which can establish data communication with an image processor storing image data characterized by comprising receiving means for receiving the image data transmitted through a communication network; and transmission means for transmitting the image data received by the receiving means to the image processor.

In the second aspect of the present invention, there is also provided a method of controlling the operations of the portable telephone set. That is, in a portable telephone set which can establish data communication with an image processor storing image data, the method is characterized in that the image data transmitted through the network is received, and the received image data is transmitted to the image processor.

In the second aspect of the present invention, it is possible to receive the image data transmitted through the network and transmit the image data to the image processor.

In a third aspect of the present invention, there is provided a digital still camera which is suitable for data communication with the portable telephone set. That is, the digital still camera which can establish data communication with a portable telephone set and can store image data is characterized by comprising receiving means for receiving a reading command issued from the portable telephone set, and transmission means for transmitting the stored image data to the portable telephone set in response to the reading command received by the receiving means.

In the third aspect of the present invention, there is also provided a method which is suitable for the digital camera. That is, in the digital camera which can establish data communication with a portable telephone set and can store image data, the method is characterized in that a reading command issued from the portable telephone set is received, and the stored image data is transmitted to the portable telephone set in response to the received reading command.

Image data which should be transmitted to the portable telephone set may be determined by being selected by a user, for example. In this case, the transmission means transmits the determined image data to the portable telephone set in response to the reading command.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 illustrates an example of a list of recorded images; and

DESCRIPTION OF THE PREFERRED EMBODIMENTS

Figure 1:
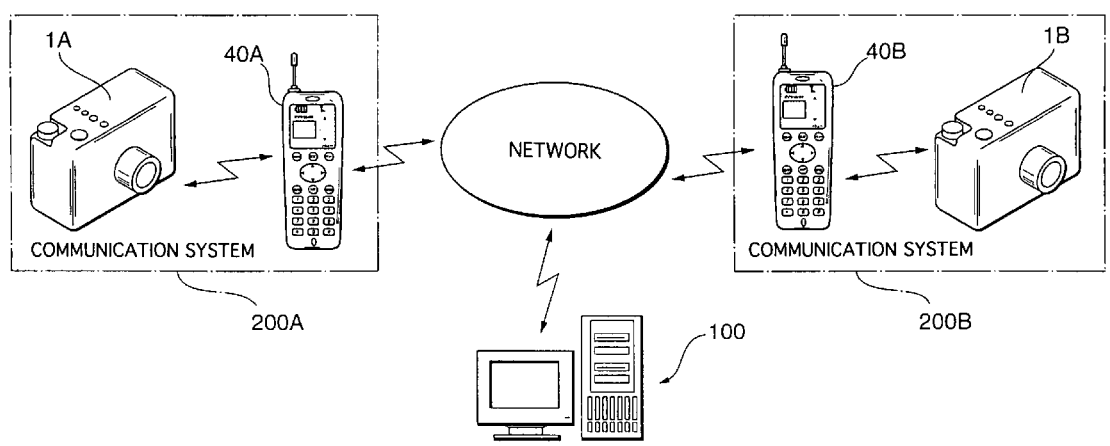
FIG. 1 illustrates the outline of an image communication system.

FIG. 1 illustrates the outline of an image communication system according to an embodiment of the present invention.

The image communication system includes a communication (transmission-receiving) system 200A, a communication (transmission-receiving) system 200B, and a server 100 which can establish data communication with one another. In the communication systems 200A and 200B image data can also be transmitted and received.

In the present embodiment, the image data is transmitted once to the server 100 from the one communication system 200A through a network (a telephone line) (wireless i.e., radio or wire). The image data is transmitted to the other communication system 200B from the server 100 through the network. It goes without saying that the image data can be transmitted from the one communication system 200A to the other communication system 200B through the network without through the server 100.

Although in the present embodiment, the image data is transmitted from the one communication system 200A to the other communication system 200B, it goes without saying that the image data can be transmitted to the one communication system 200A from the other communication system 200B. Further, although both the communication systems 200A and 200B can transmit and receive the image data, one of the systems may be for transmission only, and the other system may be for receiving only.

The communication system 200A includes a digital still camera 1A and a portable telephone set 40A which can establish data communication with each other. Although in the present embodiment, the digital still camera 1A and the portable telephone set 40A establish data communication with each other by radio, they may establish data communication with each other by wire. The communication system 200B also includes a digital still camera 1B and a portable telephone set 40B, similarly to the communication system 200A. The digital still cameras 1A and 1B have the same configuration. Further, the portable telephone sets 40A and 40B have the same configuration.

The server 100 comprises a controller such as a CPU, a memory for temporarily storing data, a modem for connection to the network, a monitor display device, and so forth.

Figure 2:
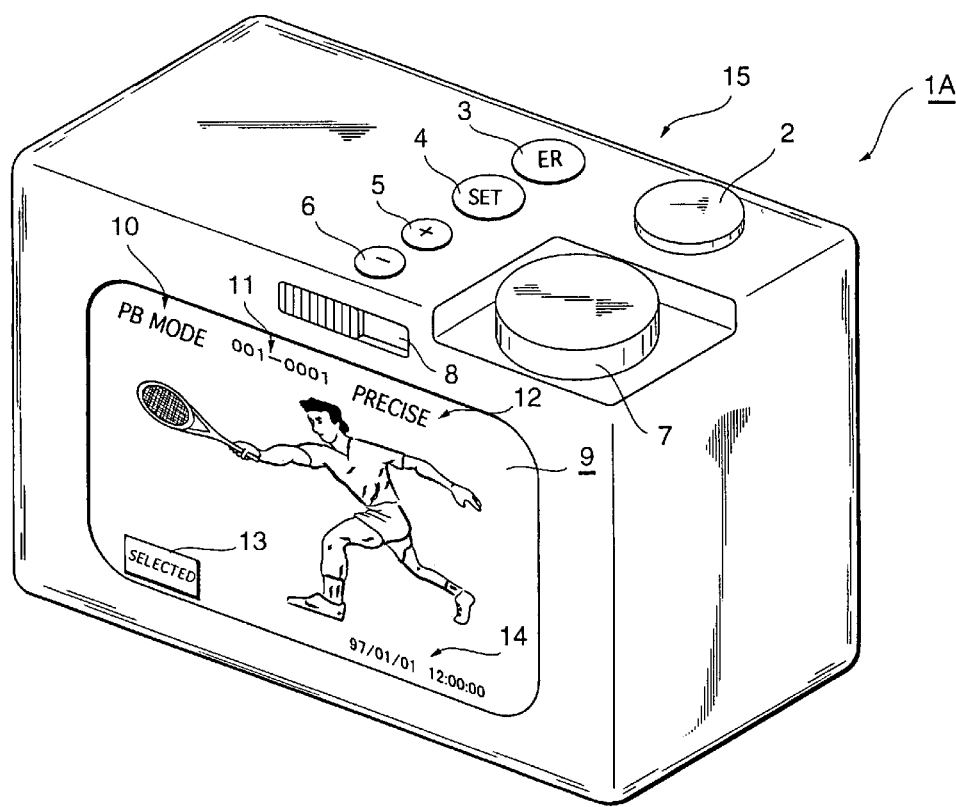
FIG. 2 is a perspective view showing a digital still camera as viewed from the rear.

FIG. 2 is a diagram showing the appearance of the digital still camera 1A as viewed from the rear.

On the upper surface of the digital still camera 1A, a group of operation switches 15 is formed on the right side thereof. The group of operation switches 15 includes a shutter release button 2, an erase (ER) button (used when a frame number of an image is erased from a list, described later) 3, a setting (SET) button (used when the frame number of the image is registered in the list, described later) 4, an increment button (used when the frame number is incremented) 5, a decrement button (used when the frame number is decremented) 6, and a mode setting dial (modes include a set-up mode, an image reproduction (playback: PB) mode, an imaging mode, a communication mode, etc.) 7.

On the rear surface of the digital still camera 1A, a display screen 9 of a liquid crystal display device is formed on nearly the entire surface thereof. An image is displayed on the display screen 9. The display screen 9 further includes an area 10 where a mode currently set is displayed, an area 11 where a frame number of the displayed image appears, and an area 12 indicating whether the image displayed on the display screen 9 is picked up in a highly precise imaging (PRECISE) mode (the compression ratio is low), is picked up in a standard mode (the standard compression ratio), or is picked up in an economy mode (the compression ratio is high). Further, the display screen 9 includes an area where a selected icon 13 indicating that the image is registered in the list, described later, appears, and an area 14 where the current date and time are displayed.

Furthermore, a power switch 8 is provided in an upper part of the rear surface of the digital still camera 1A.

Figure 3:
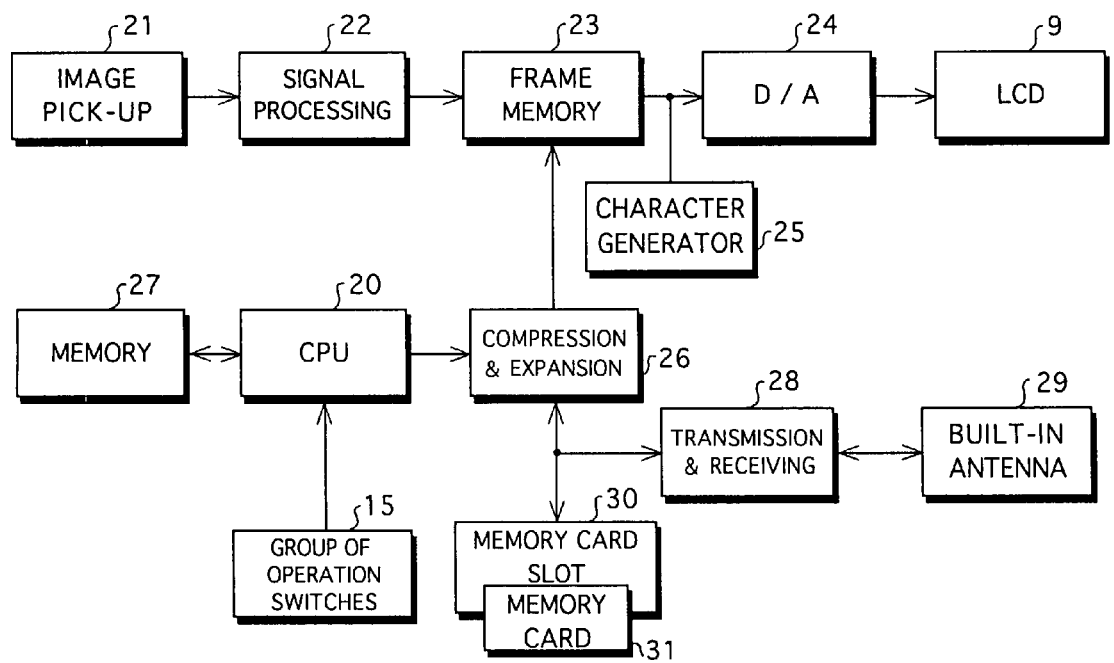
FIG. 3 is a block diagram showing the electrical configuration of the digital still camera.

FIG. 3 is a block diagram showing the electrical configuration of the digital still camera 1A.

The overall operation of the digital still camera 1A is supervised by a CPU 20.

A memory 27 for temporarily storing various data inclusive of image data is externally (attachably and detachably) attached to the CPU 20.

A signal representing the depression of each of the switches included in the group of operation switches 15 is inputted to the CPU 20.

A memory card slot 30 is formed in the digital still camera 1A. A memory card 31 is mounted on the slot 30 so as to be attachable and detachable.

Furthermore, the digital still camera 1A comprises a transmission-receiving circuit 28 and a built-in antenna 29 for establishing data communication with the portable telephone set 40A.

When the imaging mode is set by the mode setting dial 7, a subject is picked up by an image pickup device 21. An image signal representing an image of the subject is inputted to a signal processing circuit 22. The image signal is converted into digital image data in the signal processing circuit 22. Further, the digital image data is subjected to predetermined signal processing such as white balance adjustment or gamma correction in the signal processing circuit 22. Image data outputted from the signal processing circuit 22 is fed to a digital-analog conversion circuit 24 through a frame memory 23.

Predetermined (suitable) character data is outputted from a character generator 25, and is fed to the digital-analog conversion circuit 24.

In the digital-analog conversion circuit 24, image data and character data are respectively converted into analog signals. The analog signal obtained by the conversion is fed to a liquid crystal display device 9 (the liquid crystal display device is assigned the same sign as the display screen), and the image of the subject picked up is displayed on the display screen of the display device 9.

When the shutter release button 2 is pressed, image data representing the subject image is temporarily stored in the frame memory 23. The image data is read out of the frame memory 23, and is fed to a compression and expansion (decompression) circuit 26. The image data is compressed in the circuit 26. The compressed image data is fed to a memory card 31 through the memory card slot 30, and is recorded thereon.

When the communication mode is set by the mode setting dial 7, the image data recorded on the memory card 31 is read out, and is fed to the transmission-receiving circuit 28 at the time of transmitting the image. A signal modulated by the image data is fed to the built-in antenna 29 from the transmission-receiving circuit 28. The image data is transmitted to the portable telephone set 40A from the digital still camera 1A by the built-in antenna 29.

At the time of receiving the image, a signal modulated by the image data transmitted from the portable telephone set 1A is received by the built-in antenna 29. The image data extracted from the received signal by demodulation in the transmission-receiving circuit 28 is recorded on the memory card 31.

When the reproduction mode is set by the mode setting dial 7, the image data recorded on the memory card 31 is read out, and is inputted to the compression and expansion circuit 26. In the circuit 26, the compressed image data is decompressed. The decompressed image data is inputted to the digital-analog conversion circuit 24 through the frame memory 23. In the digital-analog conversion circuit 24, the image data is converted into an analog image signal. The analog image signal is fed to the liquid crystal display device 9. A reproduced image is displayed on the display screen of the liquid crystal display device 9.

Figure 4:
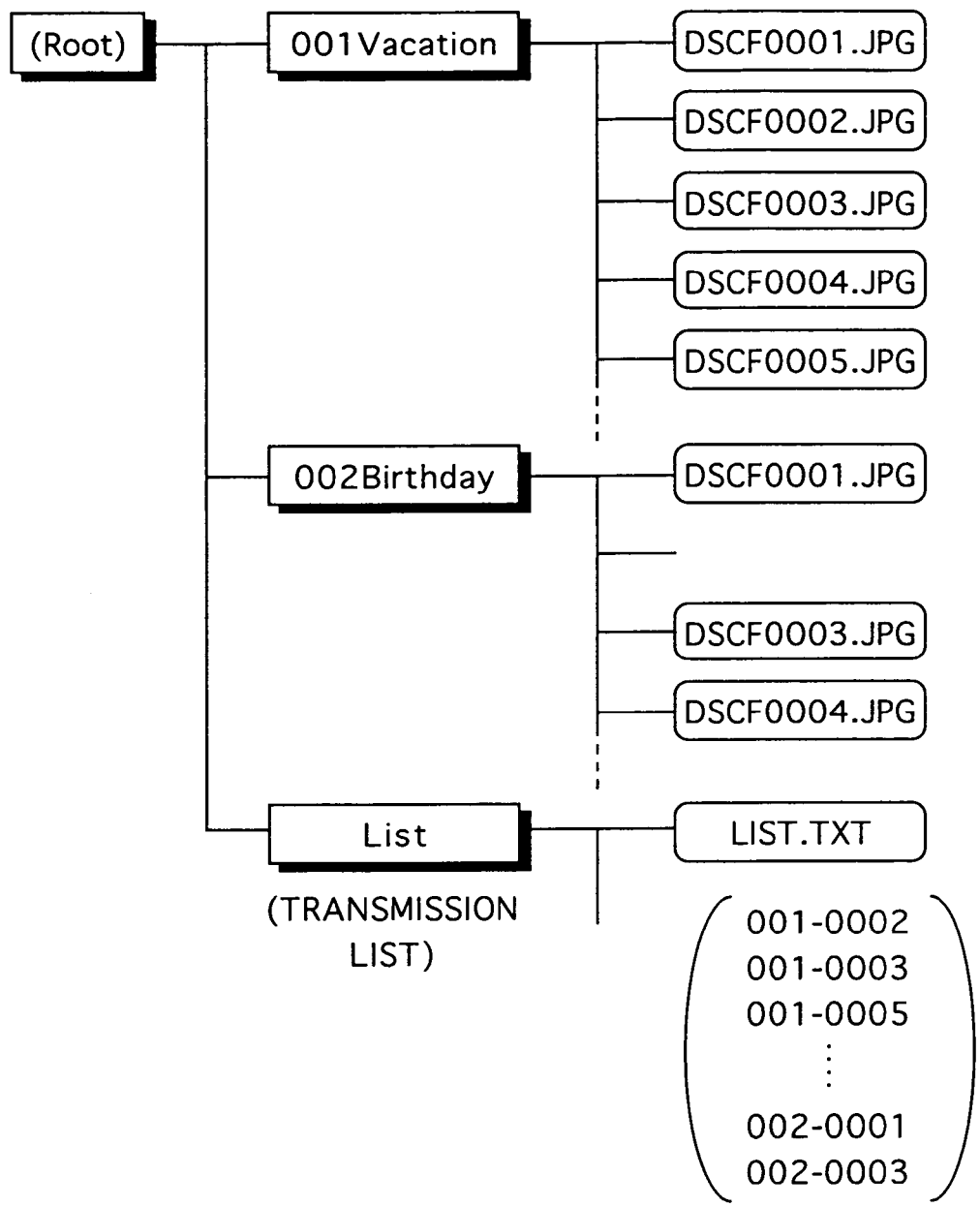
FIG. 4 illustrates the file structure of a memory card mounted on the digital still camera.

FIG. 4 illustrates the file structure of image data (image files) recorded on the memory card 31.

By a ROOT directory, a directory having a directory name "001Vacation", a directory having a directory name "002Birthday", and a directory having a directory name "List" are managed.

Both the directory having the directory name "001Vacation" and the directory having the directory name "002Birthday" manage the image files.

By the directory having the directory name "001Vacation", image files having file names "DSCF0001.JPG", "DSCF0002.JPG", "DSCF0003.JPG", "DSCF0004.JPG", "DSCF0005.JPG", etc. are managed. A connection between a directory name and a file name is a path to an image file having the file name. Further, numerals included in the directory name are a directory number, and numerals included in the file name are a file number. A numeral including the directory number and the file number connected to each other with a hyphen is the frame number.

By the directory having the directory name "002Birthday", image files having file names "DSCF0001.JPG", "DSCF0003.JPG", "DSCF0004.JPG", etc. are managed. The file numbers may not necessarily be serial numbers.

By the directory having the directory name "List", a transmission list (a list of frame numbers ("0001–0002", etc.) in an image file to be transmitted out of image files recorded on the memory card 31) is managed using a text file.

Figure 5:
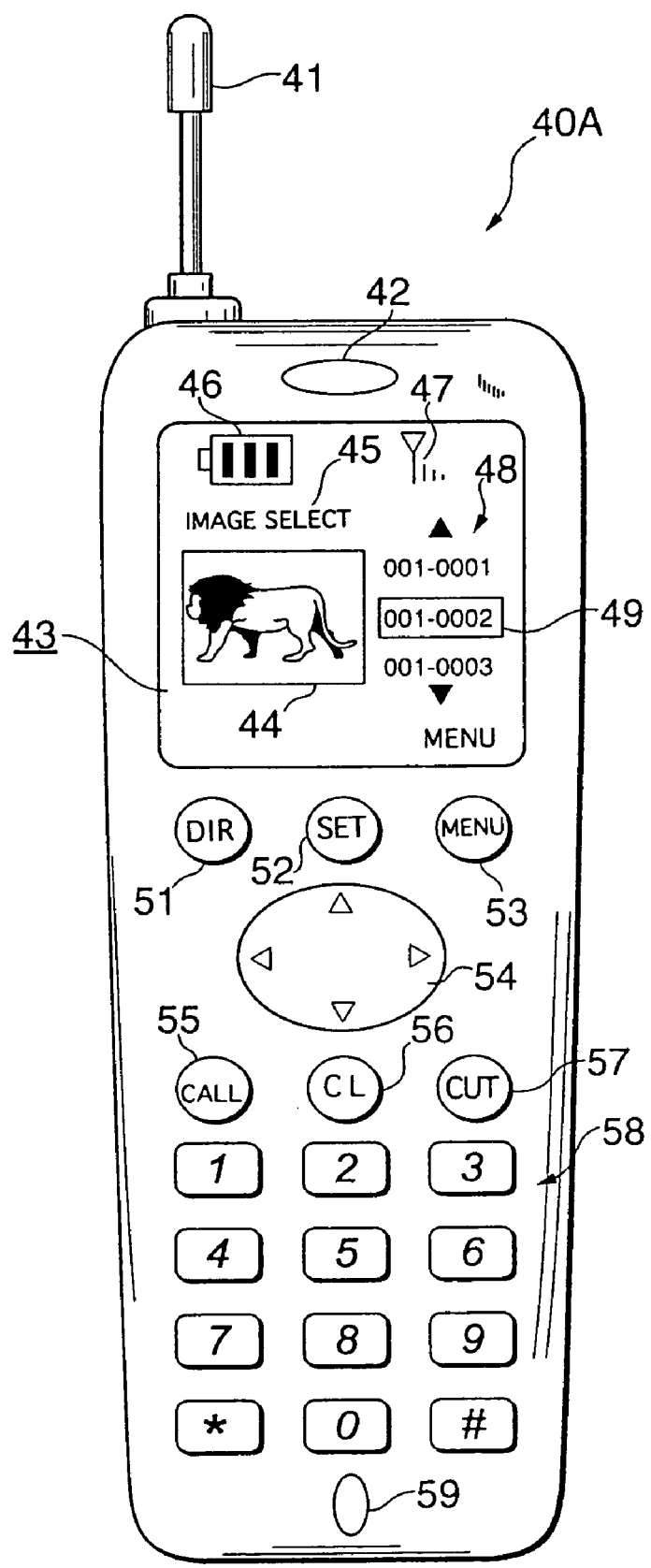
FIG. 5 is a diagram showing a portable telephone set as viewed from the front.

FIG. 5 illustrates the appearance of the portable telephone set 40A as viewed from the front.

On an upper part of the portable telephone set 40A, an antenna 41 for establishing data communication (speech communication) with the other portable telephone set 40B, the server 100, and so forth through the network is provided.

In an upper part of the front surface of the portable telephone set 40A, a speaker 42 for outputting voice is provided.

Below the speaker 42, a liquid crystal display screen 43 is formed. The liquid crystal display screen 43 includes an area 46 representing the remaining capacity of a battery in the portable telephone set 40A, an area 47 representing the degree of receiving of radio waves by the portable telephone set 40A, and an area 45 representing a menu (a mode) currently set. Further, the liquid crystal display screen 43 includes an area 44 where a thumb-nail image is displayed, and a selecting area 48 where frame numbers of images which can be selected, menus which can be selected, and so forth are displayed. A frame 49 for representing the frame number or the like to be selected is also displayed.

Below the liquid crystal display screen 43, there are provided a telephone book (directory: DIR) button 51 pressed by a user when a list of stored telephone numbers is displayed on the display screen 43, a setting (SET) button 52 pressed by the user when a setting command is issued, and a menu button 53 pressed by the user when a menu is displayed on the liquid crystal display screen 43.

An up-down and right-left button 54 is arranged below the buttons 51, 52, and 53. An up-arrow, a down-arrow, a left-arrow, and a right-arrow are formed on the up-down and right-left button 54. Portions where the arrows are indicated can be pressed. A signal indicating which of the arrows is pressed is inputted by pressing the portion of the arrow.

Below the up-down and right-left button 54, a call button 55, a clear (CL) button 56, and a cut button 57 are formed. A ten-key pad 58 is formed below the buttons 55, 56, and 57.

A microphone 59 for inputting voice is formed in a lower part on the front surface of the portable telephone set 40A.

Figure 6:
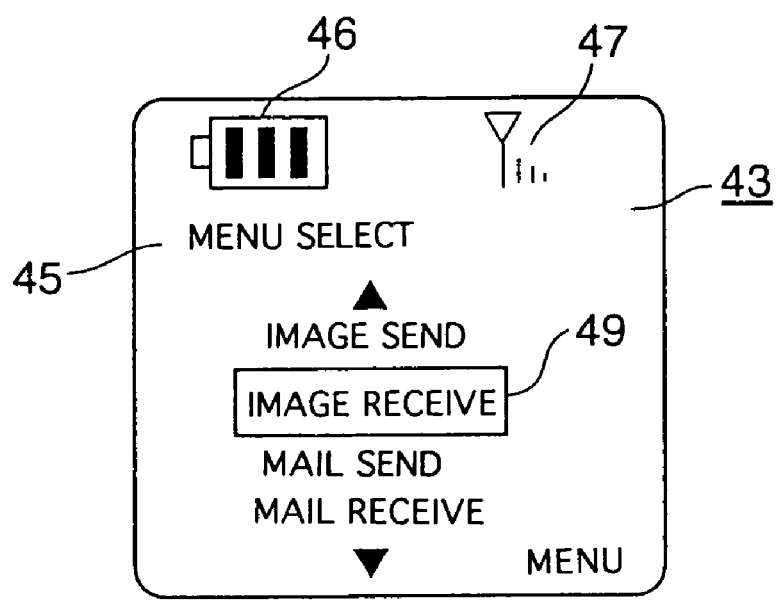
FIG. 6 is an example of a display screen of the portable telephone set.

FIG. 6 illustrates another example of the liquid crystal display screen 43 of the portable telephone set 40A.

When the above-mentioned menu button 53 is pressed, the liquid crystal display screen 43 is as shown in FIG. 6.

Selectable modes are displayed in the selecting area 48. In the present embodiment, the selectable modes include an image transmission (IMAGE SEND) mode, an image receiving (IMAGE RECEIVE) mode, a mail transmission (MAIL SEND) mode, a mail receiving (MAIL RECEIVE) mode, a speech communication mode and so on.

The frame 49 rises upward by pressing the up-arrow in the up-down and right-left button 54, while falling downward by pressing the down-arrow. The setting button 52 is pressed when the desired mode is enclosed by the frame 49, so that the mode enclosed by the frame 49 is set.

Figure 7:
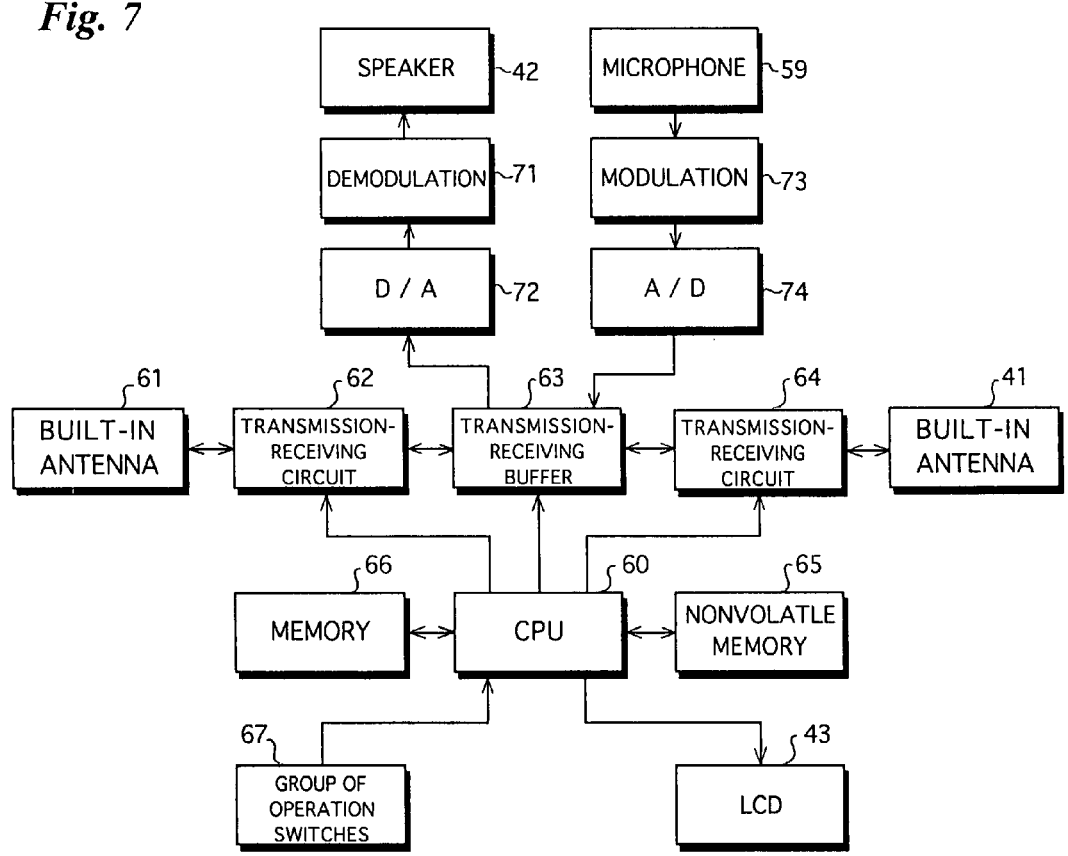
FIG. 7 is a block diagram showing the electrical configuration of the portable telephone set.

FIG. 7 is a block diagram showing the electrical configuration of the portable telephone set 40A.

The overall operation of the portable telephone set 40A is supervised by a CPU 60.

A nonvolatile memory 65 storing telephone numbers, electronic mail addresses, URLs (Uniform Resource Locator) is connected to the CPU 60.

A memory 66 temporarily storing various data is externally attached to the CPU 60.

A signal representing the depression of each of the above-mentioned switches 51~57 (a group of operation switches 67) is inputted to the CPU 60.

The voice inputted from the microphone 59 is modulated in a modulation circuit 73, and the modulated voice is fed to an analog-to-digital conversion circuit 74. In the analog-to-digital conversion circuit 74, an analog signal of the voice (modulated signal) is converted into digital voice data.

A signal representing the voice data is transmitted to a telephone set at the other end of the line from a built-in antenna through a transmission-receiving buffer 63 and a transmission-receiving circuit 64.

A signal representing the voice data transmitted from the telephone set at the other end of the line is received in the transmission-receiving circuit 64 through the built-in antenna 41. The voice data is fed to a digital-to-analog conversion circuit 72 through the transmission-receiving buffer 63. The voice data is converted into an analog voice signal in the digital-to-analog conversion circuit 72. The analog voice signal obtained by the conversion is demodulated in a demodulation circuit 71, and the demodulated analog voice signal is outputted as voice from the speaker 42.

When the image transmission mode is set, a signal modulated by the image data and transmitted from the digital still camera 1A is received by a built-in antenna 61, and is demodulated in a transmission-receiving circuit 62. The image data is outputted from the transmission-receiving circuit 62, and is temporarily stored in the transmission-receiving buffer 63.

The image data is outputted from the transmission-receiving buffer 63, and is fed to the transmission-receiving circuit 64. In the transmission-receiving circuit 64, a first carrier having a first predetermined frequency, for example 1.5 GHz, is modulated by the image data. The first carrier modulated by the image data is fed to the built-in antenna 41. The first carrier modulated by the image data is transmitted to the server 100 or the portable telephone set 40B through the network by the built-in antenna 41.

When the image receiving mode is set, a signal modulated by the image data transmitted through the network is received by the built-in antenna 41, and is demodulated in the transmission-receiving circuit 64. The image data is outputted from the transmission-receiving circuit 64, is fed to the transmission-receiving buffer 63, and is temporarily stored therein.

The image data is outputted from the transmission-receiving buffer 63, and is fed to the transmission-receiving circuit 62. The transmission-receiving circuit 62 has a second carrier having a second predetermined frequency, for example 2.4 GHz, different from the first predetermined frequency of carrier in the transmission-receiving circuit 64. The second carrier having a frequency of 2.4 GHz is modulated by the image data. The second carrier modulated by the image data is fed to the built-in antenna 61. The second carrier is transmitted to the digital still camera 1A by the built-in antenna 61.

When the image data is transmitted from the one communication system 200A to the other communication system 200B, there are a case where frame numbers of images of frames are previously registered in a transmission list, and image data are transmitted in accordance with the list, and a case where images represented by image data to be transmitted are designated for each frame.

Figure 8:
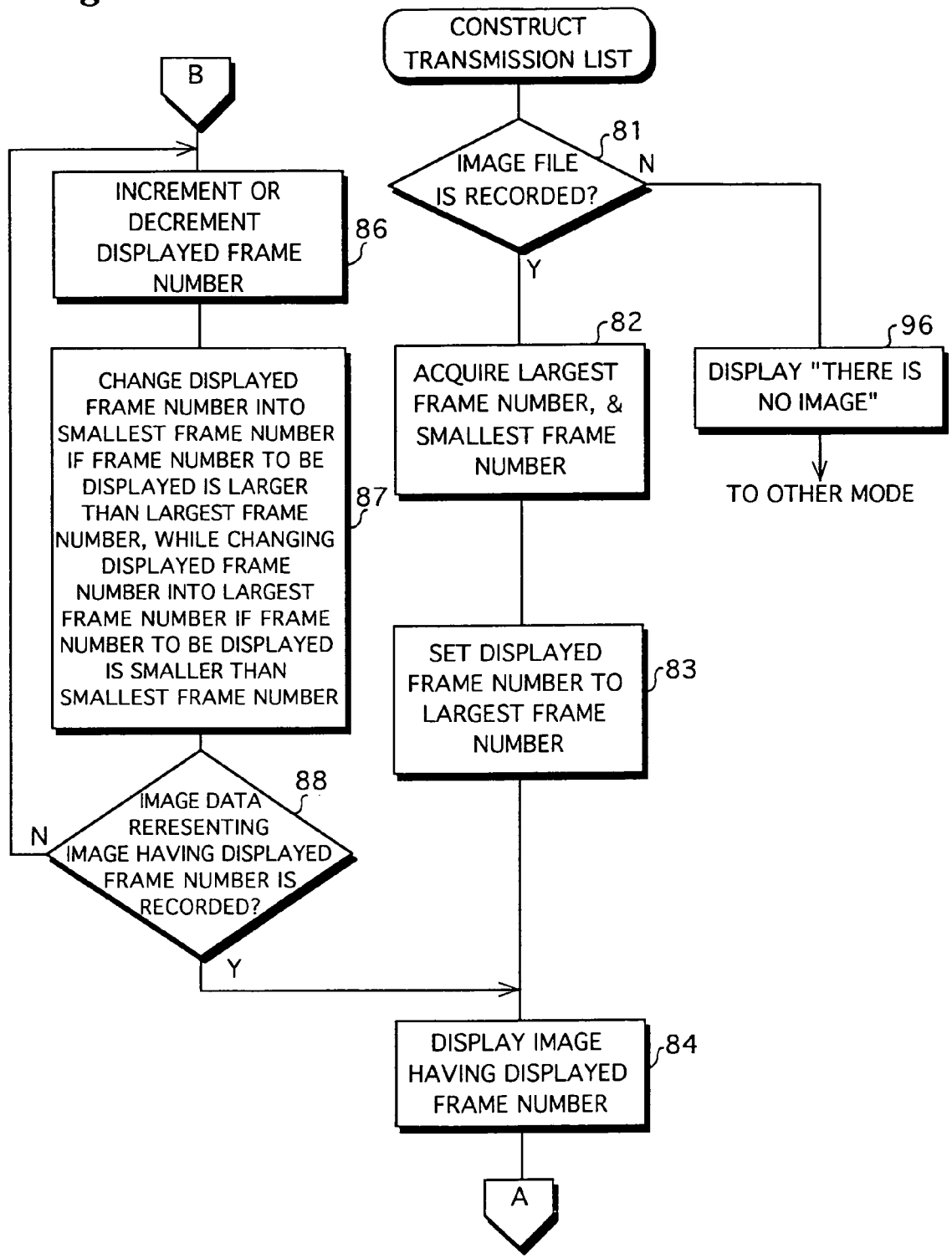
FIG. 8 is a flow chart showing a part of the procedure of processing for creating a list of images to be transmitted.
Figure 9:
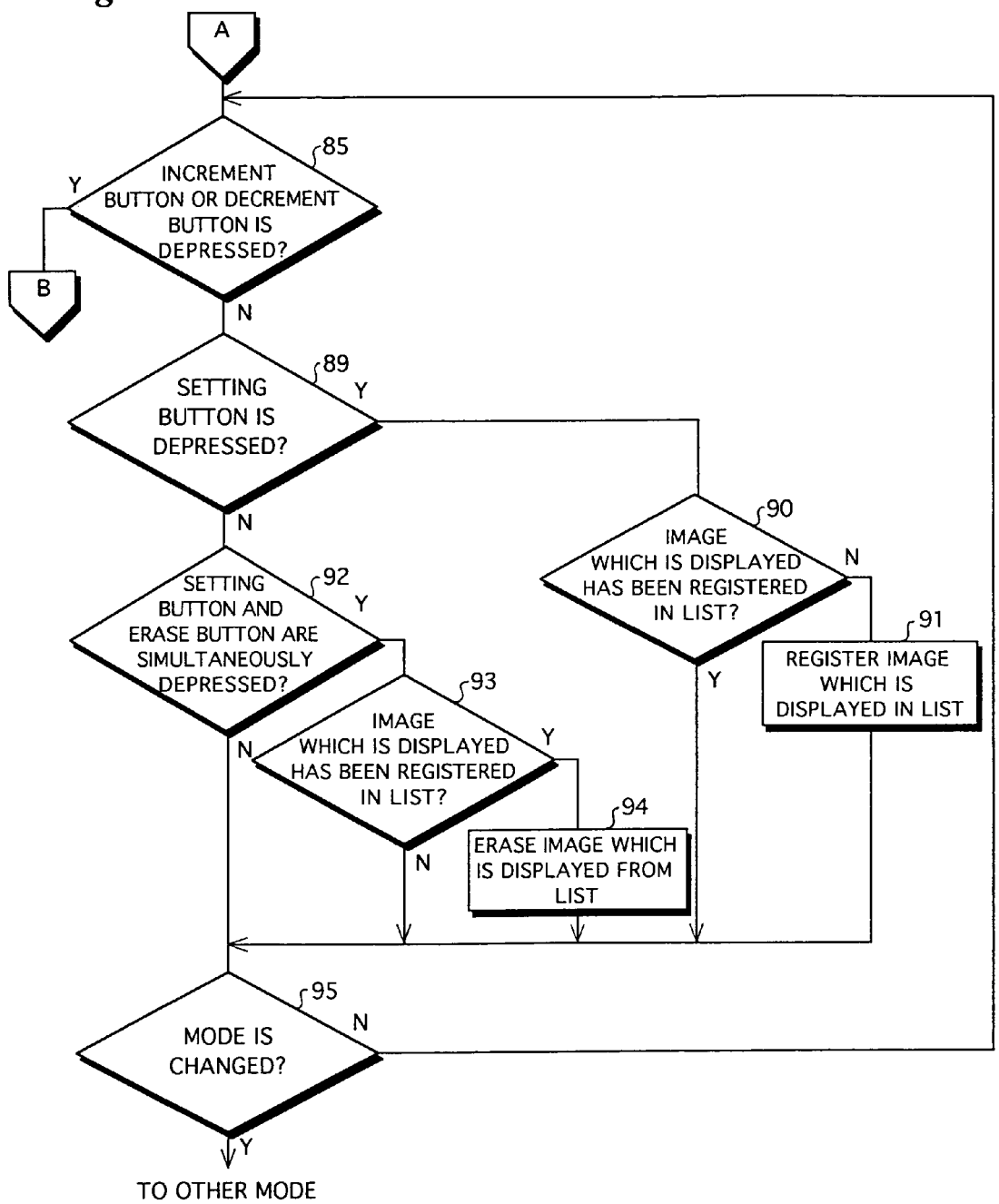
FIG. 9 is a flow chart showing another part of the procedure of processing for creating a list of images to be transmitted.

FIGS. 8 and 9 are flow charts showing the procedure of processing in a case where frame numbers of images represented by image data to be transmitted are registered in the transmission list. The processing is performed by the digital still camera 1A.

The reproduction mode is first set by the mode setting dial 7. It is confirmed whether or not the memory card 31 is mounted on the digital still camera 1A and an image file is recorded on the memory card 31 (step 81).

When the image file is recorded on the memory card 31 (YES at step 81), the largest frame number and the smallest frame number of the image files recorded on the memory card 31 are respectively acquired (step 82). A displayed frame number (a frame number of an image to be displayed on the liquid crystal display device 9) is set to the largest frame number (step 83). Consequently, image data representing the image having the displayed frame number is read out of the memory card 31, and is fed to the liquid crystal display device 9. The image having the displayed frame number is displayed on the liquid crystal display device 9 (step 84).

It is confirmed whether or not the increment button 5 or the decrement button 6 is pressed (step 85). The displayed frame number is incremented when the increment button 5 is pressed, while being decremented when the decrement button 6 is pressed (step 86).

If the frame number to be displayed is larger than the largest frame number by being incremented, the displayed frame number is changed into the smallest frame number. On the other hand, if the frame number to be displayed is smaller than the smallest frame number by being decremented, the displayed frame number is changed into the largest frame number (step 87).

When the image data representing the image having the displayed frame number is recorded in the memory card 31 (YES at step 88), the image data is read out of the memory card 31, and is fed to the liquid crystal display device 9. The image having the displayed frame number is displayed on the liquid crystal display device 9 (step 84). If the image data representing the image having the displayed frame number is not recorded in the memory card 31 due to a missing number, for example (NO at step 88), the processing at the steps 86 and 87 is repeated.

When the frame number of the image data representing the image displayed on the liquid crystal display device 9 is added into the transmission list, the increment button 5 or the decrement button 6 is not pressed (No at step 85), and the setting button 4 is pressed (YES at step 89). Consequently, it is confirmed whether or not the frame number of the image which is displayed has already been registered in the transmission list (the frame number coincides with any of the frame numbers included in the image file "LIST.TXT" managed by the directory having the directory name "List", as shown in FIG. 4) (step 90). If the frame number of the image which is displayed on the liquid crystal display device 9 has not been registered in the transmission list (NO at step 90), the frame number of the image which is displayed is registered in the transmission list (step 91). When the frame number of the image which is displayed on the liquid crystal display device 9 has already been registered (YES at step 90), the processing at the step 91 is skipped.

When the setting button 4 and the erase button 3 are simultaneously pressed (YES at step 92), it is confirmed whether or not the frame number of the image which is displayed on the liquid crystal display device 9 has already been registered in the transmission list (step 93). If the frame number of the image has been registered (YES at step 93), the frame number of the image which is displayed is erased from the transmission list (step 94).

The processing at the steps 84 to 94 is repeated, as required.

When the other mode is set by the mode setting dial 7 (YES at step 95), processing corresponding to the set mode is performed.

When no image file is included in the memory card 31 mounted on the digital still camera 1A (No at step 81), "There is no image" is displayed on the liquid crystal display device 9 (step 96).

In the above-mentioned manner, the transmission list is constructed, and is stored in the memory card 31.

Figure 10:
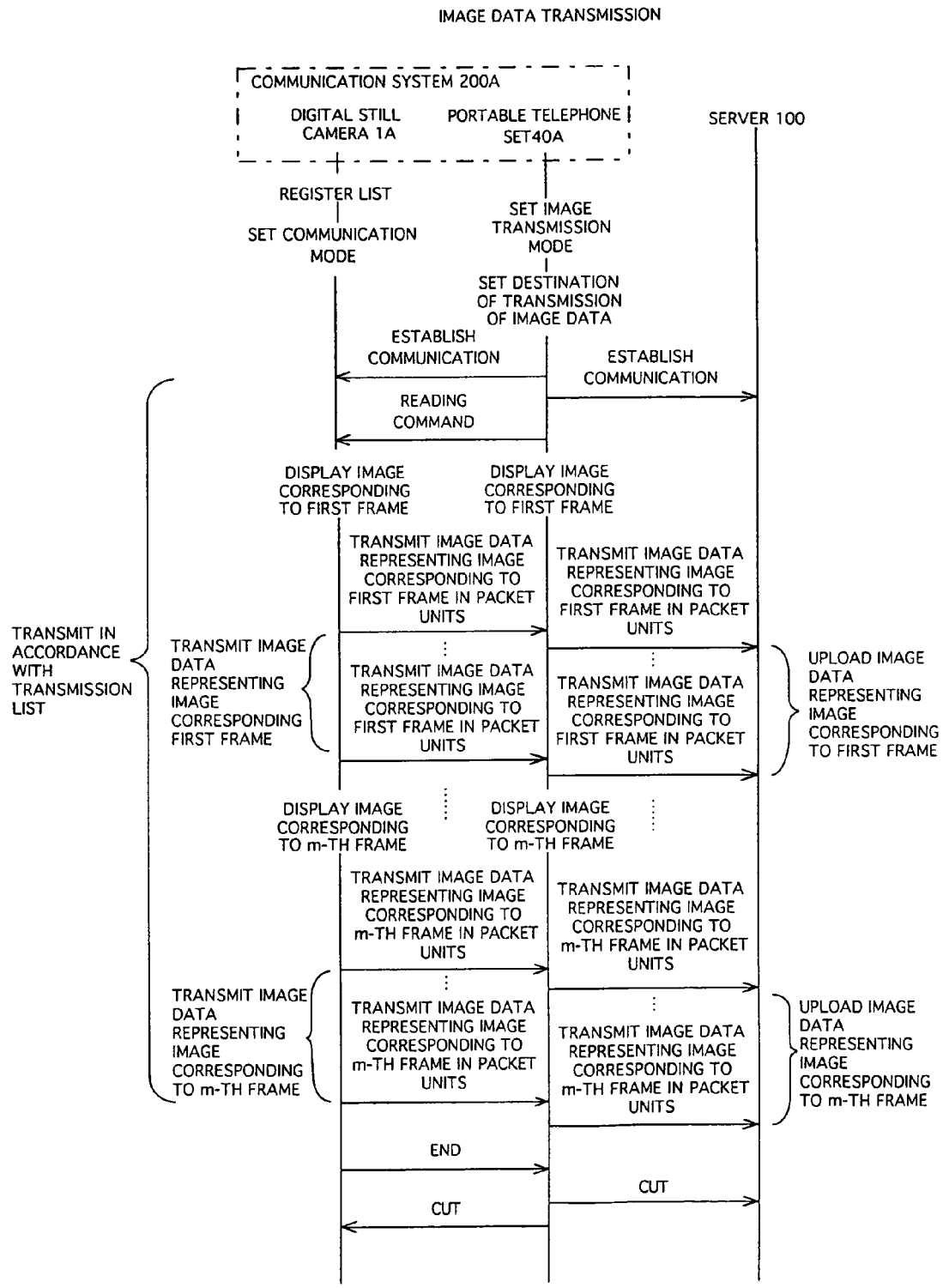
FIG. 10 is a flow chart showing the procedure of processing at the time of transmitting image data.

FIG. 10 illustrates the procedure of processing in a case where image data are transmitted to the server 100 from the digital still camera 1A and the portable telephone set 40A which constitute the communication system 200A in accordance with the transmission list previously constructed in the camera 1A.

As described above, the transmission list is registered in the memory card 31 mounted on the digital still camera 1A. Thereafter, the communication mode is set by the mode setting dial 7 in the digital still camera 1A.

The menu button 53 in the portable telephone set 40A is pressed, so that selectable modes are displayed in the selecting area 48 of the liquid crystal display screen 43. The image transmission mode is set using the up-down and right-left button 54 and the setting button 52. Further, a destination of transmission is set using the ten-key 58 or the telephone number button 51 (a telephone number, URL or an electronic mail address for making access to the server 100).

Communication between the digital still camera 1A and the portable telephone set 40A is established. Further, communication between the portable telephone set 40A and the image server 100 is established by pressing the call button 55.

When the setting button 52 in the portable telephone set 40A is depressed, an image reading command is transmitted to the digital still camera 1A from the built-in antenna 61.

When the image reading command transmitted from the portable telephone set 40A is received in the digital still camera 1A, the image data corresponding to the first frame number which is stored in the transmission list is read out of the memory card 31. The image data read out is fed to the liquid crystal display device 9 in the digital still camera 1A, and is displayed thereon. Image data representing images displayed on the liquid crystal display device 9 are successively transmitted in packet units to the portable telephone set 40A.

In the portable telephone set 40A, the image data transmitted from the digital still camera 1A are successively received. The images represented by the received image data are successively displayed in the area 44 on the liquid crystal display screen 43 in the portable telephone set 40A.

The image data transmitted in packet units from the digital still camera 1A to the portable telephone set 40A are successively transmitted in packet units to the server 100 from the portable telephone set 40A.

In the server 100, the image data transmitted from the portable telephone set 40A are successively received. Image data corresponding to one frame is uploaded in the server 100.

In the same manner, the packet transmission of image data representing images corresponding to m frames which are registered in the transmission list from the digital still camera 1A to the portable telephone set 40A and the packet transmission thereof from the portable telephone set 40A to the server 100 are repeated in accordance with the transmission list.

When the transmission of the image data representing all the images which are registered in the transmission list is terminated, the digital still camera 1A informs the portable telephone set 40A that all the image data have been transmitted, so that the communication is cut off.

Figure 11:
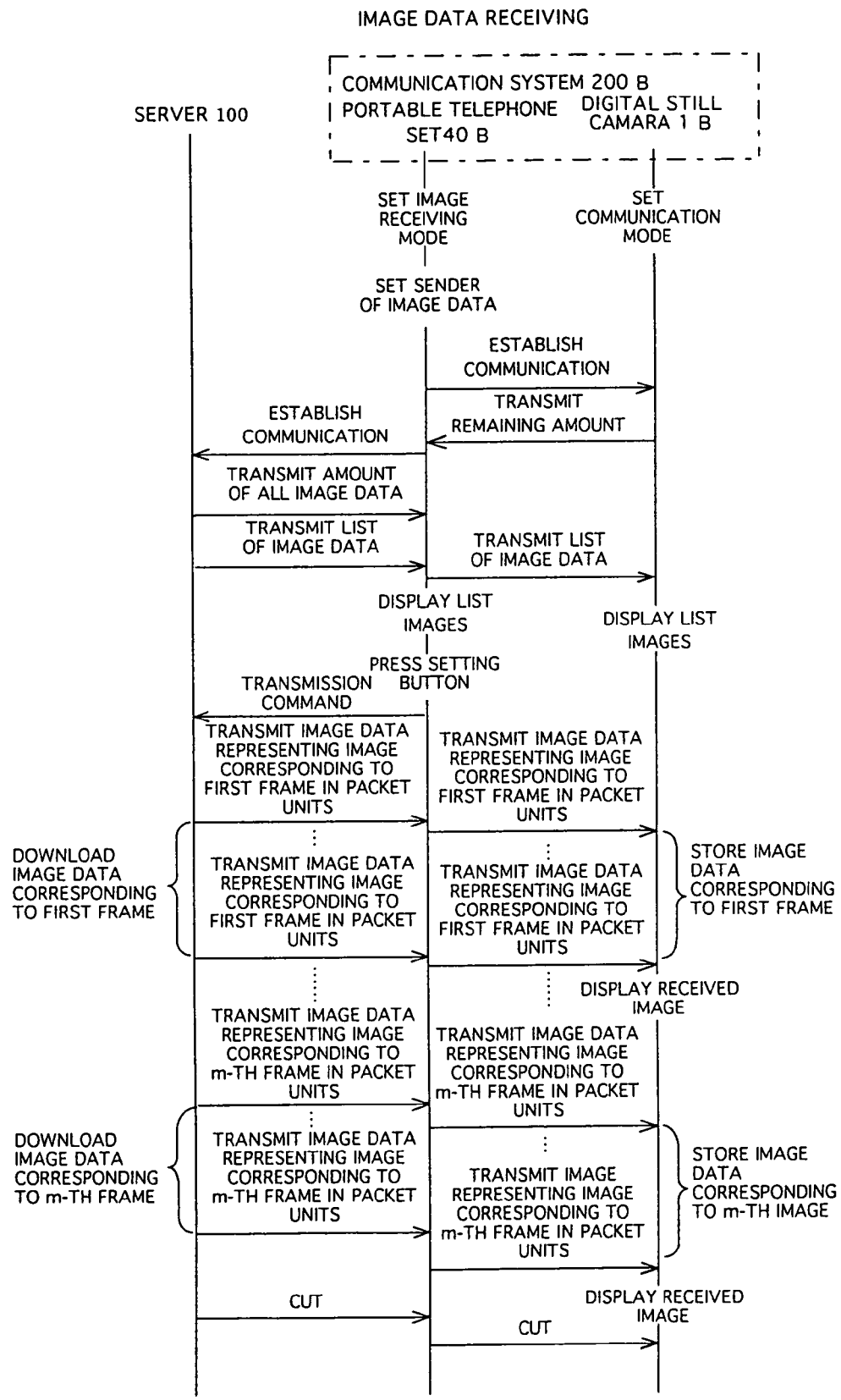
FIG. 11 is a flow chart showing the procedure of processing at the time of receiving image data.

FIG. 11 is a flow chart showing the procedure of processing in a case where all image data which have been uploaded in the server 100 are transmitted from the server 100 to the communication system 200B comprising the portable telephone set 40B and the digital still camera 1B.

In the server 100, image data representing a list of thumb-nail images corresponding to the images represented by the image data which have been uploaded in the server 100 shall be produced. It goes without saying that the data representing the list of thumb-nail images may be produced in the digital still camera 1A and transmitted to the server 100 from the digital still camera 1A through the portable telephone set 40A.

At the time of receiving the image data, the digital still camera 1B is set in the communication mode, and the portable telephone set 40B is set in the image receiving mode. Further, in the portable telephone set 40B, an identification of the server 100 which should transmit image data is set (a telephone number, URL or an electronic mail address of the server 100 is set).

When communication between the portable telephone set 40B and the digital still camera 1B is established, data representing the remaining capacity of a memory card mounted on the digital still camera 1B is transmitted to the portable telephone set 40B from the digital still camera 1B.

Furthermore, when communication between the portable telephone set 40B and the server 100 is established, data representing the amount of all image data to be transmitted is transmitted to the portable telephone set 40B from the server 100. It goes without saying that the amount of image data is previously calculated in the server 100.

Furthermore, image data representing a list of images is transmitted to the portable telephone set 40B from the server 100.

When the image data representing the list of images is received in the portable telephone set 40B, the images are listed on the liquid crystal display screen 43. Since the liquid crystal display screen 43 in the portable telephone set 40B is relatively small, it is preferable that the thumb-nail images are displayed for each frame.

The image data representing the list of images is transmitted to the digital still camera 1B from the portable telephone set 40B. The list of images is also displayed on the liquid crystal display device 9 in the digital still camera 1B.

When the setting button 52 in the portable telephone set 1B is pressed by the user, a transmission command is issued to the server 100 from the portable telephone set 1B.

When the transmission command from the portable telephone set 1B is received in the server 100, the image data are transmitted in packet units to the portable telephone set 40B from the server 100.

When the image data are received in packet units in the portable telephone set 40B, the received image data are transmitted in packet units to the digital still camera 1B from the portable telephone set 40B. When the image data corresponding to one frame is received in the digital still camera 1B, the received image data is recorded on the memory card. An image represented by the received image data is displayed on the liquid crystal display device 9 in the digital still camera 1B.

The successive transmission of the image data from the server 100 to the portable telephone set 40B is repeated with respect to all the image data which have been uploaded in the server 100. Further, the transmission of the image data from the portable telephone set 40B to the digital still camera 1B is repeated. Finally, the image data which have been uploaded in the server 100 are recorded on the memory card in the digital still camera 1B.

When the transmission of all the image data is terminated, the communication between the portable telephone set 40B and the server 100 and the communication between the portable telephone set 40B and the digital still camera 1B are cut off by the server 100.

Prior to receiving the image data in the portable telephone set 40B, the remaining capacity of the memory card mounted on the digital still camera 1B is transmitted to the portable telephone set 40B, and the amount of all the image data to be transmitted from the server 100 is transmitted to the portable telephone set 40B from the server 100. When the remaining capacity of the memory card is larger than the amount of all the image data to be transmitted, the setting button 52 in the portable telephone set 40B is pressed, as described above, so that a transmission command is transmitted to the server 100 from the portable telephone set 40B. When the remaining capacity of the memory card is smaller than the amount of all the image data, a new memory card will be mounted on the digital still camera 1B.

In the above-mentioned transmission and receiving of the image data, the image data are uploaded in the server 100 in accordance with the transmission list at the time of the transmission, while all the image data which have been uploaded in the server 100 are downloaded at the time of the receiving. However, the image data which should be transmitted and received may be designated for each frame and transmitted and received in accordance with the designation.

Figure 12:
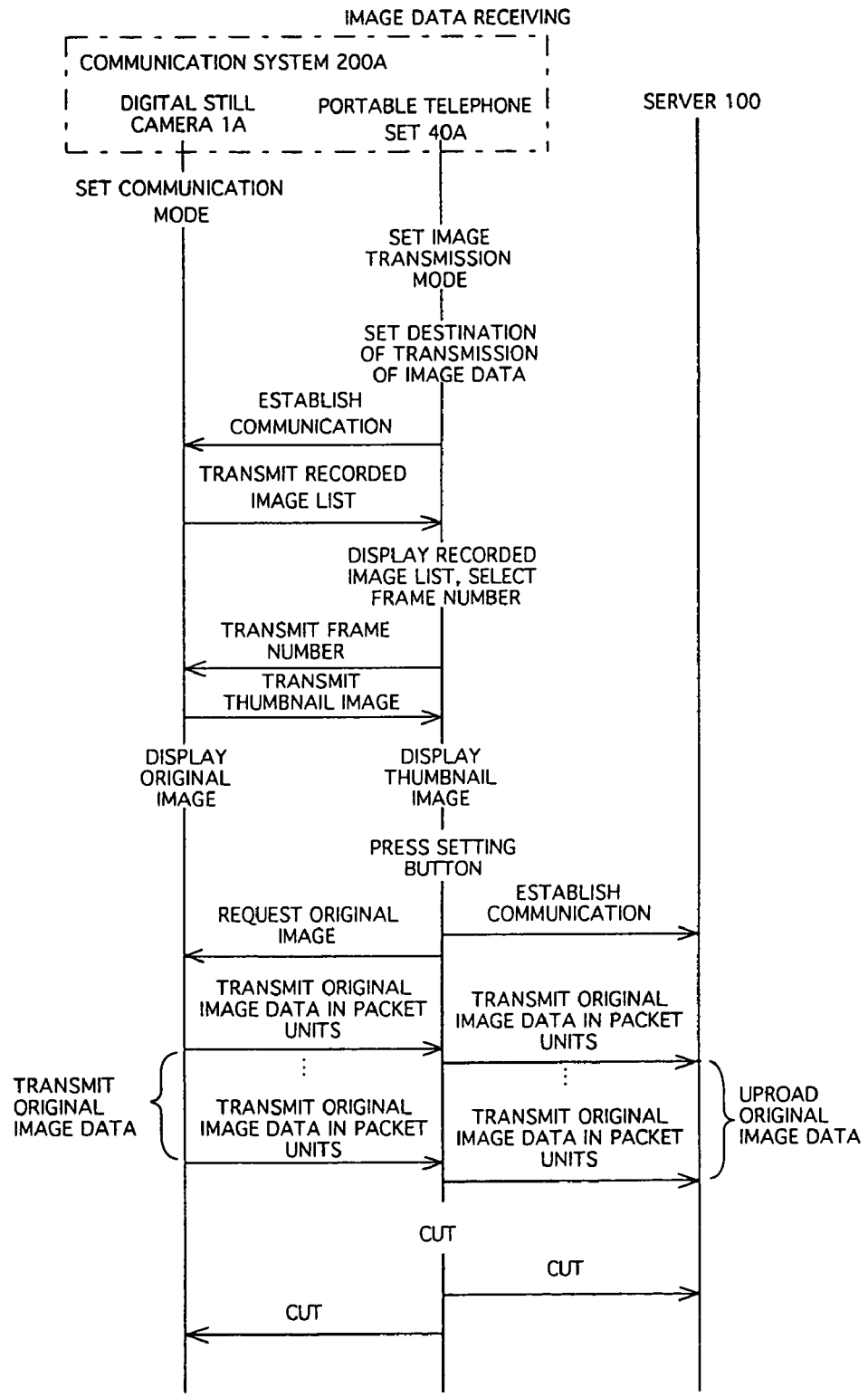
FIG. 12 is a flow chart showing the procedure of processing at the time of transmitting image data.

FIG. 12 is a flow chart showing the procedure of processing in a case where image data are designated for each frame and transmitted to the server 100 from the communication system 200A comprising the digital still camera 1A and the portable telephone set 40B.

The digital still camera 1A is first set in the communication mode.

The portable telephone set 40A is set in the image transmission mode, and a destination of transmission of the image data is also set.

When communication between the portable telephone set 40A and the digital still camera 1A is established, a recorded image list (see FIG. 13) including frame numbers corresponding to all image data which are recorded on the memory card 31 mounted on the digital still camera 1A is transmitted to the portable telephone set 40A from the digital still camera 1A. It goes without saying that the recorded image list is previously constructed in the digital still camera 1A. It goes without saying that when the communication between the digital still camera 1A and the portable telephone set 40A is established, the image data which are recorded on the memory card 31 may be retrieved to read the frame number corresponding thereto and construct the recorded image list.

When the recorded image list is received in the portable telephone set 40A, the recorded image list is displayed on the liquid crystal display screen 43. The user selects the frame number of the desired image from the recorded image list which is displayed on the liquid crystal display screen 43. Data representing the selected frame number is transmitted to the digital still camera 1A from the portable telephone set 40B.

When the data representing the frame number is received in the digital still camera 1A, image data representing the image (the original image) having the frame number and thumb-nail image data (previously produced in the camera 1A) are read out of the memory card 31. The image data representing the original image is fed to the liquid crystal display device 9, and is displayed thereon. Further, the thumb-nail image data which has been read out is transmitted to the portable telephone set 40A from the digital still camera 1A.

When the thumb-nail image data is received in the portable telephone set 40A, a thumb-nail image represented by the thumb-nail image data is displayed on the liquid crystal display screen 43 in the portable telephone set 40A. The user sees the displayed thumb-nail image, to confirm whether or not the image data representing the original image corresponding to the thumb-nail image should be transmitted to the server 100. When the image data representing the original image corresponding to the thumb-nail image is transmitted to the server 100, the setting button 52 is pressed by the user. Consequently, communication between the portable telephone set 40A and the server 100 is established.

When the setting button 52 in the portable telephone set 40B is pressed, a request for the original image is transmitted to the digital still camera 1A from the portable telephone set 40B.

When the request for the original image is received in the digital still camera 1A, the original image data is transmitted to the portable telephone set 40B in response to the request. It goes without saying that in the digital still camera 1A, the amount of image data may be decreased to transmit the image data whose amount is decreased to the portable telephone set 40B, if required.

The original image data is transmitted in packet units to the portable telephone set 40A from the digital still camera 1A.

Furthermore, the original image data is transmitted in packet units to the server 100 from the portable telephone set 40A.

Until the transmission of all the image data representing the images corresponding to desired frames is terminated, the designation of the frame number of the image data to be transmitted to the server 100, the transmission to the portable telephone set 40A from the digital still camera 1A, and the transmission to the server 100 from the portable telephone set 40A are repeated.

Figure 14:
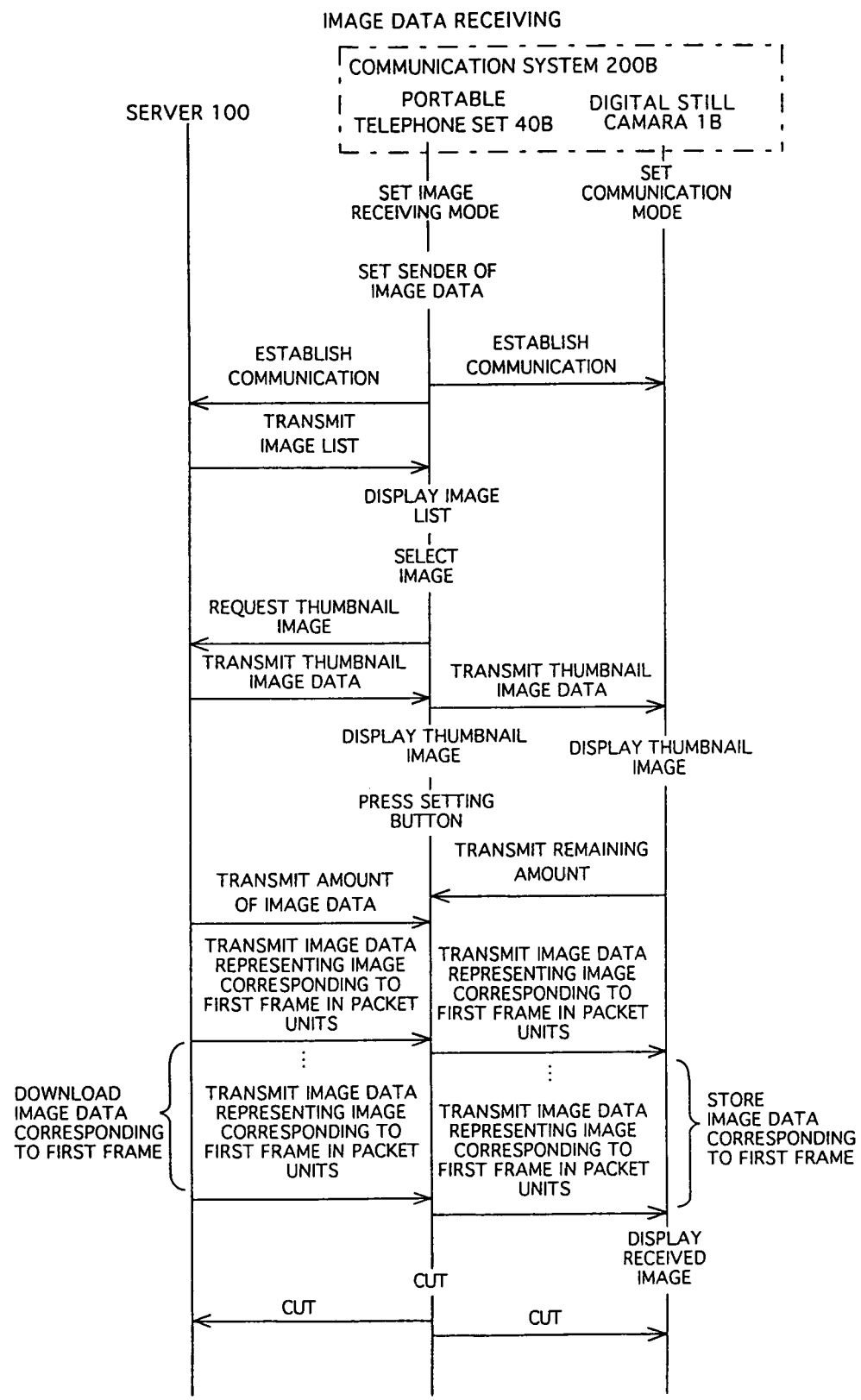
FIG. 14 is a flow chart showing the procedure of processing at the time of receiving image data.

FIG. 14 is a flow chart showing the procedure of processing in a case where image data are transmitted from the server 100 to the communication system 200B comprising the portable telephone set 40B and the digital still camera 1B.

The digital still camera 1B is set in the communication mode. Further, the portable telephone set 40B is set in the image receiving mode, so that an identification of the server 100 which should transmit the image data is set.

Consequently, communication between the portable telephone set 40B and the digital still camera 1B and communication between the portable telephone set 40B and the server 100 are respectively established.

When the communication between the portable telephone set 40B and the server 100 is established, an uploaded image list is transmitted to the portable telephone set 40B from the server 100. The uploaded image list is constructed in the server 100, and represents frame numbers of images represented by all the image data which have been transmitted from the portable telephone set 40A.

When the uploaded image list is received in the portable telephone set 40B, the uploaded image list is displayed on the liquid crystal display screen 43 in the portable telephone set 40B. The user selects the frame number of the desired image from the uploaded image list which is displayed on the liquid crystal display screen 43. Data representing the selected frame number is transmitted to the server 100 from the portable telephone set 40B. Further, a request for a thumb-nail image corresponding to the image having the selected frame number is transmitted to the server 100 from the portable telephone set 40B.

When the request for the thumb-nail image is received in the server 100, data representing the thumb-nail image is transmitted to the portable telephone set 40B in response to the request.

When the data representing the thumb-nail image is received in the portable telephone set 40B, the thumb-nail image is displayed on the liquid crystal display screen 43. The received data representing the thumb-nail image is transmitted to the digital still camera 1B from the portable telephone set 40B. The thumb-nail image is also displayed on the liquid crystal display device 9 in the digital still camera 1B.

The user sees the image which has been displayed on the display screen 43 in the portable telephone set 40B, to depress the setting button 52 in receiving the image. Consequently, data representing the remaining capacity of the memory card is transmitted to the portable telephone set 40B from the digital still camera 1B. Further, data representing the amount of the data representing the selected original image is transmitted to the portable telephone set 40B from the server 100. When the data will not be received, the clear button 56 is depressed. Processing for receiving the subsequent image data is performed.

If the remaining capacity of the digital still camera 1B is larger than the amount of the original image data to be transmitted from the server 100, and the image data representing the image displayed on the display screen 43 in the portable telephone set 40B is acceptable, the setting button 52 in the portable telephone set 40B is depressed again by the user. Consequently, the original image data is transmitted in packet units to the portable telephone set 40B from the server 100 (the image data is downloaded). Further, the original image data is transmitted in packet units to the digital still camera 1B from the portable telephone set 40B.

The original image data which has been received in the digital still camera 1B is recorded on the memory card. Further, the original image is displayed on the liquid crystal display device 9 in the digital still camera 1B.

Until all the image data representing the desired images are transmitted from the server 100, the selection of the image, the transmission of the image data from the server 100 to the portable telephone set 40B, and the transmission from the portable telephone set 40B to the digital still camera 1B are repeated.

The cut button 57 in the portable telephone set 40B is depressed, so that the communication between the portable telephone set 40B and the digital still camera 1B and the communication between the portable telephone set 40B and the server 100 are cut off.

In the above-mentioned embodiment, the uploaded image list which lists the frame numbers is transmitted to the portable telephone set 40B form the server 100, the desired frame number is selected from the uploaded image list, to select the image to be received. However, data representing a list of thumb-nail images corresponding to the images having the frame numbers represented by the uploaded image list may be transmitted to the portable telephone set 40B from the server 100, to select the desired image from the list of thumb-nail images. The frame number of the original image corresponding to the selected thumb-nail image will be transmitted to the server 100 from the portable telephone set 40B, to transmit image data representing the image having the frame number to the portable telephone set 40B from the server 100.

In the above-mentioned embodiment, the image data recorded on the digital still camera 1A are transmitted to the server 100 using the portable telephone set 40A, and the image data transmitted from the server 100 are received using the portable telephone set 40B and are recorded on the digital still camera 1B. However, image data recorded on an image processor (an image file device, a personal computer, etc.) other than the digital still camera can be also transmitted. Further, an apparatus for recording image data is not limited to the digital still camera. For example, the other image processor can be also used. Further, image data received by the portable telephone set 40B can be fed to a printer and printed by the printer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable telephone set which can establish data communication with a first image processor storing image data, comprising:
   command means for issuing a reading command to read out the image data to said first image processor;
   setting means for setting a destination of transmission of the image data;
   first receiving means for receiving the image data transmitted from said image processor in response to the reading command issued by said command means;
   first transmission means for transmitting the image data received by said first receiving means to the destination of transmission set by said setting means through a communication network;
   second receiving means for receiving the image data transmitted through the communication network;
   second transmission means for transmitting the image data received by said second receiving means to a second image processor; and
   judgment means for judging whether or not the data amount of the image data to be received by said second receiving means is not more than the amount of data which can be stored in said second image processor, said second receiving means receiving the image data when it is judged that the data amount of the image data to be received by said second receiving means is not more than the amount of data which can be stored in said second image processor.

\* \* \* \* \*